US012113644B2

(12) United States Patent
Hebeisen

(10) Patent No.: US 12,113,644 B2
(45) Date of Patent: Oct. 8, 2024

(54) WINDOW SHADE SYSTEM POWER MANAGEMENT

(71) Applicant: MECHOSHADE SYSTEMS, LLC, Long Island City, NY (US)

(72) Inventor: Stephen P. Hebeisen, Amawalk, NY (US)

(73) Assignee: MECHOSHADE SYSTEMS, LLC, Long Island City, NY (US)

(*) Notice: Subject to any disclaimer, the term of this patent is extended or adjusted under 35 U.S.C. 154(b) by 0 days.

(21) Appl. No.: 17/463,396

(22) Filed: Aug. 31, 2021

(65) Prior Publication Data
US 2022/0070019 A1 Mar. 3, 2022

Related U.S. Application Data

(60) Provisional application No. 63/073,340, filed on Sep. 1, 2020.

(51) Int. Cl.
| | | |
|---|---|---|
| *H04L 12/40* | (2006.01) | |
| *E06B 9/72* | (2006.01) | |
| *H04L 12/10* | (2006.01) | |
| *E06B 9/42* | (2006.01) | |

(52) U.S. Cl.
CPC .......... *H04L 12/40045* (2013.01); *E06B 9/72* (2013.01); *H04L 12/10* (2013.01); *E06B 9/42* (2013.01)

(58) Field of Classification Search
CPC ..... H04L 12/40045; H04L 12/10; E06B 9/72; E06B 9/42; E06B 2009/6809; E06B 2009/6818; E06B 2009/6827; E06B 9/68
See application file for complete search history.

(56) References Cited

U.S. PATENT DOCUMENTS

| | | | |
|---|---|---|---|
| 7,085,627 B2 * | 8/2006 | Bamberger | E06B 9/68 |
| | | | 700/277 |
| 8,457,793 B2 | 6/2013 | Golding et al. | |
| 8,892,910 B2 | 11/2014 | Shah | |
| 9,267,327 B2 | 2/2016 | Feldstein | |
| 9,426,020 B2 | 8/2016 | Vasseur et al. | |
| 9,860,071 B2 | 1/2018 | Bodo et al. | |
| 10,218,229 B2 | 2/2019 | Alperin et al. | |
| 10,349,494 B2 | 7/2019 | Vangeel et al. | |
| 2007/0046264 A1 * | 3/2007 | Choi | H02J 7/0068 |
| | | | 320/162 |

(Continued)

FOREIGN PATENT DOCUMENTS

| | | |
|---|---|---|
| WO | 2001052478 | 7/2001 |
| WO | 2017151314 | 9/2017 |

(Continued)

*Primary Examiner* — Phil K Nguyen
*Assistant Examiner* — Brian J Corcoran
(74) *Attorney, Agent, or Firm* — SNELL & WILMER L.L.P.

(57) ABSTRACT

A system comprises a power-over-ethernet (POE) network switch; an intelligent power distribution hub and gateway (IPDHG) configured to communicate with the POE network switch; a rechargeable battery configured to be recharged by the POE network switch; and one or more low duty cycle devices configured to communicate with the IPDHG, wherein the one or more low duty cycle devices are charged by the rechargeable battery.

20 Claims, 2 Drawing Sheets

(56) References Cited

U.S. PATENT DOCUMENTS

| | | | |
|---|---|---|---|
| 2008/0168283 A1* | 7/2008 | Penning | G06F 1/263 |
| | | | 713/310 |
| 2009/0243391 A1 | 10/2009 | Susong, III et al. | |
| 2010/0244573 A1* | 9/2010 | Karnick | H02J 7/34 |
| | | | 307/80 |
| 2011/0133551 A1* | 6/2011 | Moller | H04L 12/10 |
| | | | 307/11 |
| 2011/0307112 A1 | 12/2011 | Barrilleaux | |
| 2012/0271477 A1 | 10/2012 | Okubo et al. | |
| 2015/0130641 A1 | 5/2015 | Rahman et al. | |
| 2015/0361719 A1 | 12/2015 | Feldstein | |
| 2017/0026188 A1* | 1/2017 | Herzel | G06F 1/30 |
| 2017/0054296 A1 | 2/2017 | Daniel et al. | |
| 2017/0250828 A1 | 8/2017 | Buchanan | |
| 2017/0356243 A1* | 12/2017 | Feldstein | H04L 12/40078 |
| 2018/0228007 A1 | 8/2018 | Siefer et al. | |
| 2019/0032404 A1 | 1/2019 | Chacon et al. | |
| 2019/0081805 A1 | 3/2019 | Frezza et al. | |
| 2019/0098723 A1 | 3/2019 | Sadwick et al. | |
| 2019/0214845 A1 | 7/2019 | Hausman, Jr. et al. | |
| 2019/0218859 A1 | 7/2019 | Campagna | |
| 2020/0396106 A1* | 12/2020 | Christie | G05F 1/10 |
| 2022/0341259 A1* | 10/2022 | Chacon | E06B 9/42 |

FOREIGN PATENT DOCUMENTS

| | | |
|---|---|---|
| WO | 2019023716 | 1/2019 |
| WO | 2019043565 | 3/2019 |

\* cited by examiner

WINDOW SHADE SYSTEM POWER MANAGEMENT

CROSS REFERENCE TO RELATED APPLICATIONS

This disclosure claims priority to, and the benefits of, U.S. Provisional Patent Application No. 63/073,340 entitled "POE GATEWAY WITH BACKUP POWER" filed on Sep. 1, 2020, the entire contents of which is hereby incorporated by reference for all purposes.

FIELD

This disclosure relates to window shade power management, and more particularly, to using a power-over-ethernet (POE) network switch and an intelligent power distribution hub and gateway to power and/or re-charge one or more low duty cycle devices.

BACKGROUND

POE is a low voltage networking protocol and power solution. More specifically, POE represents both a low voltage networking communication means, and also a power connection over the same cable. In 2003, POE only supplied 13 W of power per port and evolved to a 100 W standard (IEEE802.3bt Type 4) in 2020. Residential and commercial window shade systems typically use between about 0.5 and 4 Nm DC motors to power their shades. A typical max power level is around 48 W at full torque. Because the usable power available to a port is dependent on wiring length, a load may not be capable of using the full power of the POE standard. For example, up to 71 W of the full 100 W POE standard may be available for some applications. Thus, the opportunity to use more than 1 motor on the port becomes very dependent on the number of motors and power used by each motor to control its load. In particular, the power rating on motors may be dependent on the load of the window shade which may include, for example, the size of shade, weight of material, diameter of tube, etc. The load on the window shade ultimately relates to the torque on the motor, which in turn impacts the power consumption of the motor.

Continuous use devices (e.g., lights) may utilize a larger supply of power during longer intervals while the lights are required to be activated. However, low duty cycle devices (e.g., window shades, locks, etc.) are often activated for only a small time period (discontinuous) to reposition the device or change its state after which power draw is negligible compared to peak power draw, so the devices usually have small average power requirements. One or more batteries are often used for the powering of the low duty cycle devices. Such batteries are available where they are integrated into the motor such that, when the battery is depleted, the motor must be hooked up to an external charging source or the batteries need to be replaced. As such, especially where the motor typically has a longer lifecycle, the lifecycle of the motor may be reduced to the lifecycle of the battery. In addition, the effort for the customer to reconnect a power charging source to the motor and/or the batteries can require a good amount of labor. Therefore, a strong need exists for a system that powers continuous use devices with a larger portion of available power. In addition, there is a strong need which may or may not include the prior requirement, but optimizes available power to support one or more discontinuous, low duty cycle power consuming devices that collectively draw more power than the source can provide at any instant by using rechargeable batteries that are charged between uses and store enough power to support the total power consumption when required.

SUMMARY

In various embodiments, the system may comprise a power-over-ethernet (POE) network switch; an intelligent power distribution hub and gateway (IPDHG) configured to communicate with the POE network switch; a rechargeable battery configured to be recharged by the POE network switch; and one or more low duty cycle devices configured to communicate with the IPDHG, wherein the one or more low duty cycle devices are charged by the rechargeable battery. The system conserves energy costs by using the power during lower rate times or outside of peak power requirements.

The low duty cycle devices may comprise non-continuous duty cycle devices. The low duty cycle devices may be charged by the rechargeable battery during low occupancy. The low duty cycle devices may include at least one of a motor, lock, light or HVAC. The activation of the low duty cycle devices may avoid a time period when the one or more low duty cycle devices are charged by the rechargeable battery. A first device receives a recharging current and relays the recharging current to a second device, in response to the first device having sufficient current.

The IPDHG may be a master low duty cycle device. The IPDHG may be configured to obtain at least one of current, voltage, power and energy consumption information about the one or more low duty cycle devices. The IPDHG may be configured to power down the one or more low duty cycle devices when not in use.

The POE network switch may charge the continuous duty cycle devices. The POE network switch may be configured to recharge a battery backup in a managed way to support best battery life and power usage requirements. For continuous use devices, a large portion of the POE network switch power may support the power requirement.

The instantaneous power delivery to low duty cycle devices from the rechargeable battery may exceed the capacity of the POE network switch. The rechargeable battery may be further configured to increase the power delivery capability for the low duty cycle devices to support more devices per port. The rechargeable battery may be configured to be replaced without replacing the one or more low duty cycle devices. A second device may be restricted from charging, in response to a first device being charged by the rechargeable battery. A first device may obtain priority to be charged by the rechargeable battery, in response to the first device having a lower charge.

BRIEF DESCRIPTION OF DRAWINGS

The features and advantages of the present disclosure will become more apparent from the detailed description set forth below when taken in conjunction with the drawings.

DETAILED DESCRIPTION

Figure 1:
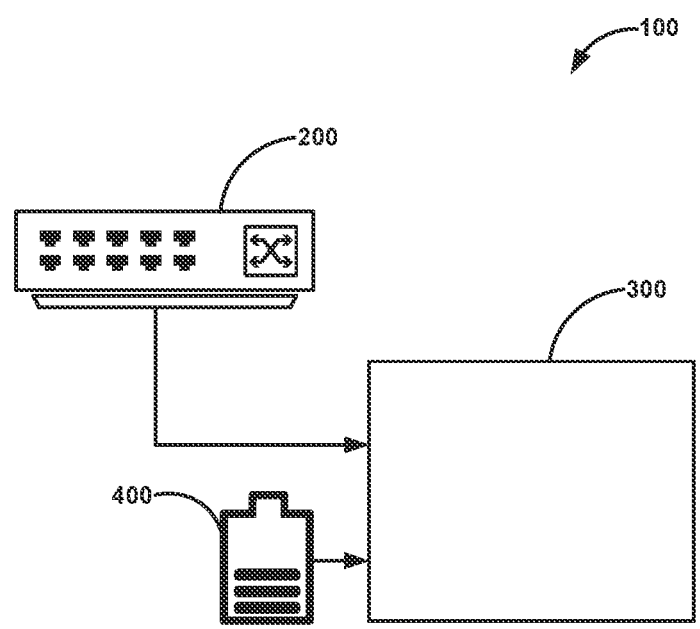
FIG. 1 is a general overview of an exemplary system 100 including a POE network switch 200, an IPDHG 300 and a battery bank 400, in accordance with various embodiments.

In various embodiments, as shown in FIG. 1, the system 100 may include a POE network switch 200 and an intelligent power distribution hub and/or gateway (IPDHG 300). The IPDHG 300 may or may not include a power deliver system 400. For example, power delivery system 400 may include a rechargeable backup battery and/or associated circuitry, or power delivery system 400 may be a separate device connected to the IPDHG. The POE network switch 200 and IPDHG 300 may be different devices or integrated into the same device with combined features. The POE network switch 200 may interface with IPDHG 300 using a CAT5 or CAT6 cable with RJ45 terminations equipped to properly support the data and power requirement for the port and IPDHG requirements. The wiring distance between the POE network switch 200 and IPDHG 300 may need to be limited (e.g., 328 feet). The maximum wiring distance from IPDHG 300 to the downstream devices may be dependent on the power wire gauge and load draw. The POE network switch 200 and IPDHG 300 may be separately mounted or may fit into a rack assembly (e.g., Cisco CBD8U, Cisco Catalyst C9300 or C9400 Series Network Chassis and properly configured LAN card assembly, or other similar products by other manufacturers). A master motor may provide some or all of the functions of the IPDHG 300. As such, any references herein to a master motor and/or an IPDHG 300 may be interchangeable. The master motor and/or IPDHG 300 may also manage downstream devices including, for example, motors, lights, HVAC or other devices. The concepts discussed herein apply whether the system 100 includes a centralized automation controller/server which manages the automation for all the devices or a fully distributed intelligent network of devices that receive sensor information and independently determine their shade position (e.g., internet of things (IOT)).

The system 100 efficiently manages and distributes power and also may distribute networked communication to networked devices. The system 100 optimizes power usage over time. In general, and as set forth in FIGS. 1-2, the system 100 offers power to support low duty cycle devices from a POE network switch 200 (e.g., a single POE network switch). The low duty cycle devices may include, for example, motorized window shades, locks, etc. Such low duty cycle devices may be DC-powered, AC-powered or other power sources. The system 100 may increase the power delivery capability for these low duty cycle devices to support more devices per port. The POE network switch 200 may recharge any battery 400 backup in a managed way to support best battery life and power usage requirements. Instantaneous power delivery can exceed the capacity of the POE network switch 200 for low duty cycle devices. The thresholds for what may be considered an acceptable low duty cycle device may take on different meanings based on total power storage capability vs recharge time. For example, battery 400 power can exceed POE network switch 200 power because the POE network switch 200 may charge the battery 400 over time such that the battery 400 may store additional power, and can be fully recharged after use to provide the same level of power prior to power consumption starting again. For continuous use devices (e.g., lights), a large portion of the POE network switch 200 power can support the power requirement. A backup power delivery may be configurable to provide power to continuous duty devices and/or low duty devices. The power delivery system may be configurable based on power loss situations, for example, and based on power usage such as for powering life safety pathway lighting or lighting exit signage. It may also be configurable for use during utility demand response programs where utility fed energy needs to be conserved. While the batteries and POE technology may add additional costs to the system 100, the cost of batteries and POE technology may be centralized and/or amortized across a number of intelligent connected devices. While the system 100 may include continuous and/or non-continuous duty cycle devices, some of the devices may or may not include POE technology. This arrangement also increases the fanout of intelligent devices connected to a single POE network switch 200. The system 100 may be plenum-rated, fan-less, and/or could also reside in an IT closet with a managed environment.

The system 100 may also conserve energy costs by using the power during lower rate times or outside of peak power requirements (e.g., weekend or nights). The system 100 may consider the product use times, in order to determine when to re-charge. For example, motorized DC window shades typically are not adjusted at night (i.e., the system 100 will not activate or need battery 400 power during the nighttime), so the system 100 may re-charge during the nighttime. The system 100 may integrate with motion sensors, building schedules, computer activation history, elevator access systems, parking systems, employee check-in/out systems or employee schedules to determine times when a room may not be occupied. The system 100 may move the shades to the down position at an earlier time (even if the down position is or is not a preferred setting at the time), so the shades will not be moved during the re-charge process which may be at a later time. The system 100 may also learn device usage times by using historical usage data, artificial intelligence and/or predictive algorithms to analyze potential or future use of the devices. The system 100 may then determine when the systems 100 are used the least, and re-charge during those low usage times.

The system 100 may include one or more POE network switches 200. A POE network switch 200 is any network switch that has a POE injection built-in to the switch. A midspan (or POE injector) may be used to add POE capability to regular non-POE network links. Midspans may be used to upgrade existing LAN installations to POE and provide a versatile solution where fewer POE ports are required. The POE network switch 200 may provide a high-speed network connection and power supply to power devices. The POE network switch 200 may reduce the need for extra outlets and extension cables, while also reducing deployment and labor costs. The use of a POE network switch 200 may allow POE powered devices to be easily moved to locations without power outlets. As such, the POE powered devices may be placed in hard to reach locations or locations further away from a power source, Window shade systems 100 are ideal for use with a POE network switch 200 because window shade systems 100 (including the motors) are often in ceilings that are typically hard to reach and do not usually include electrical outlets. A POE network switch 200 also automatically detects power consumption by POE powered devices and a required amount of power supply. POE network switch 200 may optimally allocate power to help minimize power waste and help businesses save money.

Figure 2:
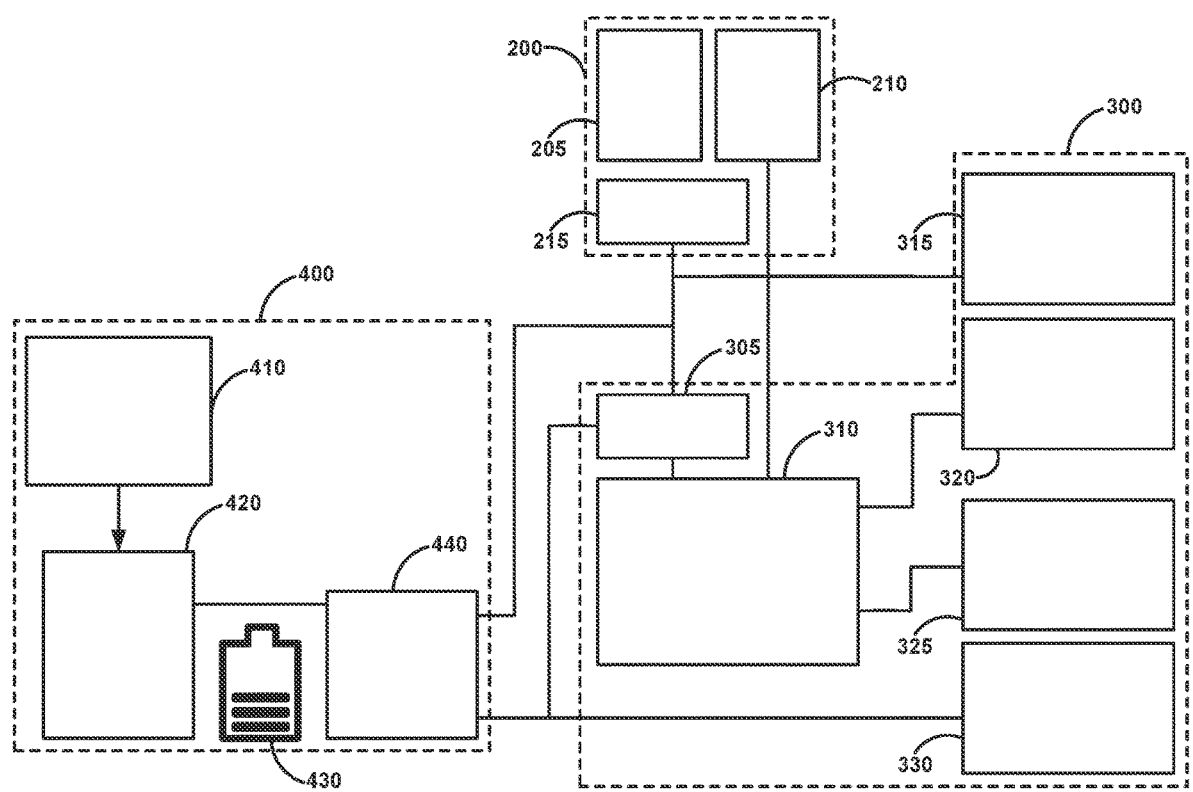
FIG. 2 is a more detailed exemplary system 100 including various components within the POE network switch 200, IPDHG 300 and battery bank 400, in accordance with various embodiments.

As shown in FIG. 2, in various embodiments, the POE network switch 200 or the IPDHG 300 may include a POE power supply 205, a POE database 210 and a power negotiation unit 215. In various embodiments, the POE network switch 200 may provide power to recharge a battery 400 for one or more non-continuous duty cycle devices and/or power directly continuous duty cycle devices. As mentioned, battery 400 power can exceed POE network switch 200 power because the POE network switch 200 may charge the battery 400 over time such that the battery 400 may store additional power. For example, depending on amount of battery 400 power, the system 100 could power 2×50 W shade solutions for maximum duration (e.g., 5 minutes) simultaneously from a 30 W 802.3AT Port. The battery 400 power can provide emergency power for a limited time during power outages to discontinuous and/or continuous duty devices. The emergency power may support the life safety systems. In various embodiments, the POE network switch 200 may be rack mounted inside an environmentally controlled room by being adapted into, for example, a 19" rack kit (e.g., Cisco Catalyst CDB-8U UPOE Plenum Network Switch). The components may be separately mounted, but when installed with a POE network switch 200, the components should ideally fit a rack assembly (e.g., a rack assembly designed for Cisco CBD8U). The POE network switch 200 could also be any POE type based on battery 400 storage capabilities for Non-continuous Duty Cycle Devices or power capabilities to direct drive Continuous Duty Cycle Devices. In that regard, the maximum power delivery for the POE network switch 200 may include 15.4 W for the POE 802.3AF Type1, 30 W for the POE 802.3AT Type2, 60 W for the POE 802.3BT Type3 or 90 W for the POE 802.3BT Type4.

IPDHG 300 may include a networked power distribution unit (PDU) and may include the network switch 200 or link (e.g., via a CAT5 or CAT6 cable) to the network switch 200. IPDHG 300 may also include a POE power supply 205, a POE database 210 and a power negotiation unit 215 within the IPDHG 300. As shown in FIG. 2, in various embodiments, the IPDHG 300 may include a power regulation unit 305, a processor with support circuitry 310, a continuous duty network power management unit 315, a continuous duty network transceiver 320, a non-continuous duty network power management unit 330, and a non-continuous duty network transceiver 325. IPDHG 300 may increase the efficiencies of data transmission with real-time remote power monitoring, environmental monitoring and/or infrastructure integration. IPDHG 300 may also provide increased uptime. For example, administrators can monitor power at the device level or PDU level. IPDHG 300 may include user-defined thresholds. IPDHG 300 may provide alerts on potential issues before the issues become a problem and may optimize the performance of different devices (e.g., motors). IPDHG 300 may provide capacity planning by providing information about power consumption (e.g., for each device). IPDHG 300 may provide baseline utilization to predict equipment failure. The IPDHG 300 may identify stranded capacity to accurately plan floor expansions. IPDHG 300 may reduce costs and power consumption. IPDHG 300 may use outlet level power monitoring and trend analysis to monitor server performance and reboot certain systems that are having problems (reducing the cost of site visits). IPDHG 300 may power down certain equipment not being used during off-hours to conserve energy. IPDHG 300 may also possess transceivers that communicate with environmental sensors to help improve efficiency. As such, IPDHG 300 may reduce carbon footprints. IPDHG 300 may collect real-time current (amps), voltage, power (kVA, kW), and/or energy consumption (kWh). IPDHG 300 may provide reports that alert any unforeseen issues and help comprehend real-time power load, capacity, and trends across the infrastructure system. The processor circuitry 310 may support intelligent control and operation of networked continuous use devices or low duty cycle devices. This control may support individual, group, room, façade, floor or building-wide control and/or automation.

IPDHG 300 may provide a configurable percentage of port power that may be used for lights and other continuous duty devices. IPDHG 300 may also provide power from rechargeable batteries for use with shades, locks and other discontinuous use devices. In various embodiments, IPDHG 300 may include any wiring option with power and network capability. The power can be separate from the network or combined. The systems and functions discussed herein may also include various combinations of charging, re-charging and/or trickle-charging. In various embodiments, IPDHG 300 may not include any trickle-charging and may provide full power to the devices. The maximum power delivery for the IPDHG 300 may include 15.4 W or 12.95 W for the POE 802.3AF Type1, 30 W or 25.5 W for the POE 802.3AT Type2, 60 W or 51 W for the POE 802.3BT Type3, or 90 W or 71 W for the POE 802.3BT Type4.

A rechargeable battery system 400 (e.g. a battery storage bank) may be internal or external of IPDHG 300. The batteries may be replaceable, without having to replace the entire motor. The system 100 may include a dedicated rapid-charge port for when the battery system 400 is fully discharged. The rapid charge port could be connected to a line voltage powered source. This line voltage power source could be from a backup power generator. Batteries 400 may be rechargeable and can be replaceable in the IPDHG 300. The IPDHG 300 may be located in a centralized location for easy access for replacement of the batteries 400. By having a replaceable battery 400, certain powered devices may have a life expectancy longer than a rechargeable battery 400 that may otherwise not be replaceable. As shown in FIG. 2, the battery system 400 may include, for example, a 120V/230V AC power supply 410 that supplies a rapid recharge port 420. The rapid recharge port 420 may provide power to the battery bank 430. The battery bank 430 may be monitored by a battery monitor and recharge circuit 440.

A POE power supply can be a power injector or a POE network switch 200. Either of these typically are connected to line voltage AC power to derive the energy needed for the POE power supply. This power supply can be used to power devices directly, but when trickle re-charging, current may go over an Ethernet cable and/or use POE protocols. A power device may convert AC to a DC trickle-charging current. The DC trickle-charge re-charging current is typically set by the motors as the current often varies based on charge percentage, but the current could be coordinated over the ethernet.

In various embodiments, the IPDHG 300 may not be AC powered. The IPDHG 300 may be powered over POE by a third-party POE power injector or POE network switch 200. The IPDHG 300 may support AC power as a rapid charge or backup power connection option.

A first device (e.g., motor) may serve a role in delivering a re-charging current to a second device's battery. Each motor may receive a re-charging current, and if the current is not needed at the time, the motor may relay the current onto the next device. The motor may include an algorithm that determines when the current is not needed, so the algorithm instructs the motor to relay the current to the next device. As discussed herein, the motor may have (or acquire) information on historical needs or predicted needs, so the motor may determine when additional current is needed or not needed. As such, the motor may direct the re-charging current to the next motor if not needed versus sourcing the re-charging current for the next motor from the motor's own battery (which in this case would be charged from the unit before it). Each successive unit in the daisy chain gets re-charged from the unit before it, and the first unit gets direct charge from the power supply.

In various embodiments, IPDHG 300 may provide a central power connection to devices on the network, and may use the network to identify which device can draw from the IPDHG 300, when the device can draw from the IPDHG 300, and/or for how long. This concept may be used for battery charging or it may be used for powering a continuous or low duty cycle device's load. The concept is similar to a "token passing" solution for battery 400 charging. The system 100 may restrict more than one device from re-charging at a time. If the power supply can handle the load, the system 100 may have multiple devices re-charging at the same time. For example, the system 100 could allow devices to connect and charge sequentially until full or allow multiple devices to charge in parallel. The system 100 may use a TDMA (time division multiple access) approach and provide a time slice where each device could connect for a certain timeframe and interleave the devices. The length of time each device is charging or operating could be variable based on the level of charge existing in the device battery and the power requirements. For example, if the device's battery is more drained, then the system 100 may allow the device to connect for a longer period of time.

In various embodiments, the system 100 may include motorized shades as an example of non-continuous duty cycle loads. The motorized window shades are typically DC-powered motors that could be brushed or brushless. The system 100 may include for example four motors without internal batteries that can connect to IPDHG 300 even if the power capacity of each motor is about 50 W and the port power delivers 51 W if the battery capacity supports to total power need. IPDHG 300 may connect with more motors, if any of the motors consume less power. The connection from the IPDHG 300 can be daisy chained among the motors if the total wiring length does not reduce voltage levels too much. Devices could be intelligently be configured to IPDHG 300 through a network connection in order to manage a maximum power draw to manage overdrawing IPDHG 300.

With respect to power management, in various embodiments, the system 100 may run multiple motors from the same POE network switch 200 based on power usage. The shade motor and/or IPDHG 300 may have information about a motor's maximum current draw/supply/power needs and can communicate and manage those needs independently or in conjunction with the POE network switch 200. This could be configured, for example, in the IPDHG 300 at the time of production, during field setup, learned from the motor when it is first operated and adjusted over time based on usage, and/or provided over a network connection between the IPDHG 300 and the shade motor or motors where this information is stored. The information may help match a motor power class with standardized and/or enhanced POE power classifications. The shade motor can be programmed with a maximum motor power class and/or a power curve based on planned shade height relative to motor part number at time of production. The IPDHG could plan the motor power usage based on this power curve enabling full optimization of available power and number of shade motors that can use it. The selection of the power class or power curve may be over-stated because may try to factor the maximum value for the maximum torque of the motor when a shade assembly and may not use anywhere near that maximum torque requirement.

In response to the power curves of all (or any subset of) motors connected to the IPDHG being received and validated to work within the power supply capabilities of the battery, the IPDHG sets up synchronization with those motors based on its required control scheme and authorizes it for operation. In various embodiments, if the battery power is sufficient to power the motors simultaneously in parallel, then the IPDHG may not setup specific synchronization timing between the motors because power should always be sufficient. A synchronization signal (synch signal) is specifically being utilized to tell the controller within each motor when it can operate the motor (similar to the techniques discussed earlier for battery charging sequencing if the motor has an internal battery to charge). However, if the battery power is insufficient to power the motors all simultaneously, and the motors will be run in parallel, then a synchronization timing may be setup between the IPDHG and each motor so that each motor has a time slot to access power. Since the motor will require quiescent power to typically run internal electronics and processors, power is available continuously for the motor but it may not move the shade outside of the synchronization times. Synchronization signals can be given to the motor via a number of methods either via a network command or via a separate synchronization wire connection. The motors may request permission to move the motor, which may come with its own drawbacks on potential latency. The system may reduce the total battery power by only having one motor powered at any one time while still moving motors in parallel. For example, with 2 motors running in a common group, the system may allow motor #1 to operate for 10 msec during which the windings of the motor are pulsed, and during the next 10 msec motor #2 is allowed to operate while motor #1 "coasts". This type of approach may include a tightly designed motor and control scheme to ensure there is constant speed under all load conditions while confirming that "cogging" does not occur (which creates an undesirable vibration in the shade movement when it is not powered sufficiently to keep the brake properly open for motor movement).

The motor or IPDHG 300 may communicate with a POE network switch 200 to establish a power limit for power consumption on a port. Establishing a power limit may be accomplished in POE networks using LLDP, but there are several well specified means to do this via the IEEE802.3 Ethernet standard for POE. A master motor or IPDHG 300 would aggregate the maximum power needs of all motors attached downstream in order to negotiate a power class setting with the IPDHG 300 For example, the IPDHG 300 may be configured to secure the highest available port power when IPDHG 300 first connects to a network switch. As each motor is connected to the IPDHG, a handshake can occur if the motor is intelligent either sharing the motor power requirements through the network or setting up a learning process per motor. If the motor is not intelligent, then a learning process could be employed or a field tool could be used to program the IPDHG accordingly. If the motor is not intelligent, then dedicated ports would likely be deployed for each connected motor. Where multiple motors or devices are located downstream, the system 100 may establish (or re-negotiate) a revised power class as the devices come online.

In various embodiments, the production configuration engine includes information about the characteristics of the shade assembly and motor. The production configuration engine may have information such as, for example, shade size, hanging weight of shade assembly (fabric+hembar), tube diameter and fabric RUD, frictional losses of the shade assembly (i.e., due to multi-banded linkage, troughs (in a larger shade comprised of multiple shades connected to each other), blackout zipper channels, motor part number, etc. The production configuration engine may program a motor power curve and calculated motor power class from its database taking into account the dynamics of the shade assembly and configuration relative to the chosen motor. The production configuration engine may consider motor factors at the time of production such as, for example, lifecycle frictional losses and/or motor run-in. Power curves may be provided typically through a lookup table based on the motor part number or motor type being added. The configuration engine may apply the power curves into power capacity planning, while the configuration engine monitors the actual position of each motor, and recognizing the anticipated power draw when the motor is restarted in either direction.

In various embodiments, prior to shipment, the shade assembly may be created with or without a matching IPDHG 300. The torque/power curve associated with the window shade may be monitored by the motor and/or an external piece of equipment. The motor may store the torque/power curve into a database of the motor. In addition, with the information from the power curve, the motor (and/or external equipment) may calculate a motor power class. The motor power class may be stored in the motor and/or IPDHG 300 taking into account factors such as lifecycle friction impacts, stall condition, etc. based on the type of window covering assembly being employed. For example, multiband shade assemblies must include a bearing and connecting rod between shade bands. The frictional loss here translates into power requirements that should be planned (as well as learned) as wear impacts the operation of the system over time.

In various embodiments, the shade motor senses the motor current or power consumption during installation when certain limits are set. Current sensing can be managed using methods such as, for example, by employing hall effect sensors, resistive elements that induce a voltage based on current passing across the resistive elements, etc. With networked motors, the process of tracking these factors can be completed local to the motor and communicated to the IPDHG 300. The IPDHG 300 may verify these parameters during the first operation. For non-networked motors, the process may be tightly controlled by the IPDHG 300 in onboarding that motor and sensing the current draw over the course of its operation from top to bottom limit. As used herein, any of the functions performed by the motor may be performed by the IPDHG 300 and/or external equipment. Based on the power curve, the motor calculates a motor class which it employs in planning power usage. The power class may be stored in the motor. The motor may also consider factors such as, for example, lifecycle friction impacts, stall condition, limit settings and/or operation. This data may help the IPDHG 300 plan for worst case scenarios especially when group controlling motors. For example, regarding the limit setting, if the motor's power classification is preconfigured, then the motor may verify the power curve after the window shade limits are set. The motor may relay the information to the IPDHG 300 (if part of the system 100) and the IPDHG 300 may re-negotiate the power class with the POE network switch 200 using standard IEEE802.3 methods. The motor may learn from its operation over a lifecycle using artificial intelligence or machine learning. The motor may alter the power class based on "break-in" of the motor or shade linkage hardware (e.g., the motor may heat up and distribute the lubrication, so the motor becomes more lubricated and runs with less friction). Friction may increase over time which would increase the power class.

The system 100 having the ability to change the power requirements may open up new capacity for other future devices that may communicate with IPDHG 300 or POE network switch 200. For example, the system 100 may redirect power between ports within a POE network switch 200. If the power requirement increases and the POE network switch 200 does not have sufficient capacity, the system 100 may transmit an alert or signal to a user or BMS as part of a preventative maintenance program within the motor.

The threshold established is used either by the motor, the IPDHG 300 directly and/or the POE network switch 200 to detect and/or shut down motors that exceed their threshold to ensure the excess power does not impact the operation of other motors connected to the same port. A motor may exceed a threshold due to, for example, stall conditions from obstacles or a malfunction in the motor. The system 100 may include filters and response times to determine an acceptable range or threshold before handling noise, surges, startup surge, stall conditions, etc when appropriately responding to failure situations. To ensure the POE network switch 200 (and any other equipment connected) are operated safely and reliably within their specifications, the system 100 may analyze power supply ratings relative to maximum average current draw, as well as surges and fast transients. If any of these factors is out of an optimal range or threshold, and a shut-down is required, then the motor, IPDHG 300 and/or POS network switch may process an alert, so that proper preventative maintenance algorithms can be enacted. In addition, the devices may also log events (e.g., a required shut down) in order to support artificial intelligence, learning and historical data needs. The motor may also periodically store and/or update a previously stored power curve (while saving the production curve for reference) in order to analyze and help diagnose preventative maintenance opportunities.

In various embodiments, as mentioned, the master motor (or IPDHG 300 may serve as a master) may manage downstream devices including motors, lights, HVAC or other devices. A motor can be setup as a "master" with a "slave" port that supports daisy-chaining power and network downstream to another motor or other device that connects to it. The "master" motor may have true master control capability to "slaves" connected downstream of the master motor. The master motor may simply be a distribution port for "slaves" that employ the same power/communication capability as that on the "master". The slave port connection could be POE or the connection could be a different power and network connection that supports the "slave" motor. The "master" motor is capable of being configured to "host" communication and control for the "slave" motor on POE in case the "slave" motor is not on POE. The "slave" port could also facilitate power/communication and control to HVAC equipment, as well as other building/room control equipment. The master may shut down the slave, for example, when sudden changes in power draw from a "slave' may exist. A training or configuration process may be used to configure a "slave" motor to a "master" motor. An equipped push button and LED may provide interaction with the installer in order to execute this "pairing" sequence. The pairing may involve obtaining power curve and other data from the slave motor downstream In various embodiments, pairing modes may setup optimize power usage. Special pairing modes can be setup between paired motors (e.g., motors that operate solar shades, motors that operate blackout shades, motors on different control zones, etc.) to ensure the motors will not operate at the same time in order to ensure that any one POE network switch 200 port is not overdrawn for power. This allows two or more motors to be paired by the same POE network switch 200 port without increasing the power classification requirements. Therefore, when any motor in the port is commanded to operate, the operating motor validates that other paired motors are not operational prior to moving. Such validation can involve network messaging with a paired motor to verify the paired motor is not moving, and otherwise disabled until the intended motor moves. The system 100 may also involve messaging between the intended motor and the IPDHG 300 (or master motor) to ensure there is power capacity prior to operating. If the power capacity is not sufficient, then the motor may wait for a message that indicates that the power capacity is available.

Once the intended motor is ready to move, the paired motor(s) may be disabled from operation and the intended motor subsequently moves per the command. A command to the paired motors can re-enable the disabled motors, after the movement of the intended motor is complete. This coordination can be completed by the IPDHG 300, master motor or paired motor. Paired motors that are disabled may still receive movement commands pertaining to the paired motors, while the paired motors are disabled. The paired motors may store the last commanded movement, and when the paired motor is re-enabled, the paired motor initiates its own movement sequence to move to the last requested position. While disabled, the paired motor may issue a response command that coordinates with the requestor about its current state and intention to move when re-enabled, and/or may also coordinate its movements with the requestor when it begins and ends those movements.

In various embodiments, the motor may include distributed intelligence such that the motor may use information from other subsystems to optimize the shade positioning. The building management system (BMS), HVAC system and/or lighting system may optimize automation settings by accessing power draw information. For example, in a lighting system, the power draw may be based on a current sensor/transformer. By having the shade system 100 identify lighting load power and/or HVAC power during an automated move, the shading system 100 may identify the net impact of the position of the shades are having under the given conditions. This information can identify whether the automation is having the desired impact. For example, the information may determine that the automation results in comfort overrides that are reactionary or if the automation results in shade movements that do not produce a desired comfort or energy result. In particular, even after the shades are lowered, the system 100 determines, based on the power load, that the lighting is increased and the HVAC override is implemented to lower the temperature further down than the scheduled temperature. By learning (e.g., using AI/ML), the shade positioning can be further optimized in order to achieve the desired result.

The motor, POE network switch 200 and/or IPDHG 300 may use zone information to optimize functionality. Zones crossing over between shades, lighting and HVAC can have a succinct impact. For example, an HVAC zone may be impacted by the daylight managed by a shade zone. The lighting zone could be directly affected by the daylight coming into the window or indirectly affected in an adjacent space where it may be of interest to forecast impacts about to happen to this zone, and/or managing contrast ratios in an open plan across multiple zones. Contrast ratios are differences in brightness between window wall and working surface. For example, when you are inside a cave and looking out at the mouth, the difference between the brightness at the mouth and the surrounding room surfaces are significant, and thus, you cannot recognize details in anything in front of you. This can happen if the shades are letting in a lot of daylight, and in response, the lighting shuts off. A more comfortable system 100 might place lights on at 25% to reduce the contrast ratio to make the surroundings more comfortable, even though increasing power usage.

In various embodiments, the system 100 may optimize automation settings while a space is occupied (to help with comfort for human performance, productivity, wellness, etc.) and while a space is unoccupied (to help with energy performance). A ceiling-based photosensor may detect (e.g., in a closed loop fashion) the light level typically on the desk, working surface, and/or floor. The photosensor may have a variety of ranges and views. A ceiling-based photosensor may be able to differentiate artificial light vs daylight. This type of sensor may provide closed loop information about the amount of daylight hitting a working surface. The outward-facing daylight sensor or sky camera detects the amount of daylight entering the window and the angle that the daylight enters the window. Thus, the system 100 is configured for tracking the internal reaction to natural light at various angles and intensities. Such tracking may help for optimizing automation and learning (AI) algorithms. Similarly, if the ceiling-based sensor and/or the outward looking photosensor also detect color temperature as well as daylight level, then color temperature of LEDs for artificial light sources can be optimized for wellness requirements for circadian control.

The motor may also be configured with solar tracking parameters (as further explained herein and incorporated by reference) in order to implement automation routines in a smart way on a distributed intelligent control network (versus centralized where a server tells each motor how and when to operate). The system 100 may also include the use of tools (e.g., smartphones) to configure the shade limits and solar tracking settings. The system 100 may also provide the motor with data such as, for example, GPS location, shade orientation (e.g., West-facing), sill height, shade height, overhangs, etc.

In various embodiments, the system 100 may include fabric with photovoltaic cells. The system 100 may optimize automation routines to supplement energy storage for a building to help offset peak demand and even extend the use of a power base. The system 100 may include blackout shades and weld flexible photovoltaic cells to the shade to harness energy. The system 100 can be configured to cover the internal shade by moving a photovoltaic shade at the same time to make it more aesthetic from the interior. The system 100 may also incorporate fabrics that are made with photovoltaic materials. These features may integrate with the development of a power grid for the building that would store/consume the energy the shades can harness (sunlight, kinetic motion, etc.). The system 100 may bring power from the fabric to the motor inside the tube. The system 100 may bring power from the fabric, to the motor, then from the motor to the inside of the building which will connect with the building grid.

In various embodiments, the system 100 may include battery 400 shades. The system 100 may optimize shade movement to minimize power consumption in the battery 400 powered motors. Sky cameras can play a significant role by minimizing shade movement to reduce power needs based on existing and future sky conditions.

In various embodiments, the system 100 may include optimizing battery 400 management or energy demand internally on lighting usage vs shade usage etc. relative to future sky conditions. Optimized integration of shades with lights and HVAC may help mitigate and/or shift load for energy reasons, while still optimizing for comfort. The system 100 may not just set shades at certain levels, but the system 100 may coordinate with lighting and HVAC settings to determine the optimal settings for the window shades. Other energy savings features may be found in U.S. Ser. No. 17/395,340 filed on Aug. 5, 2021 and entitled "Systems And Methods For Energy Savings In Buildings," which is hereby incorporated by reference in its entirety for all purposes.

The motor, POE network switch 200 and/or IPDHG 300 may also coordinate certain lighting functions (e.g., continuous loads). Coordinating lighting with a shade can facilitate perimeter lighting associated with the window opening in order to support decorative features for those looking at the location from the outside, decorative features for those looking at the location from inside the room (ie. wall washing above the shade, wall washing across the shade) or privacy looking from outside-in or potentially from inside-out. Furthermore, coordinating lighting with a shade could also facilitate using the shade as a window light at night time by using shade material that has fiber optic lighting qualities (e.g., weaves having side light fibers) or by providing backlight and/or power/control for an LED/LCD type shade material that is capable of static or rolling capabilities. In various embodiments, the light could even be part of (or within) the shade pocket to support decorative lighting from the room side and/or window side lighting for decorative and/or privacy requirements during low light conditions.

The system 100 may include solar tracking systems that provide analysis of sky conditions and instructions for activating or deactivating the continuous duty devices and/or low duty devices. Such solar tracking system may include the features and functions in, for example, U.S. Ser. No. 14/692,868 which is a continuation of PCT Application No. PCT/US2013/066316 filed on Oct. 23, 2013 and entitled "Automated Shade Control System Utilizing Brightness Modeling". PCT Application No. PCT/US2013/066316 is a continuation of U.S. Ser. No. 13/671,018 filed on Nov. 7, 2012, now U.S. Pat. No. 8,890,456 entitled "Automated Shade Control System Utilizing Brightness Modeling". U.S. Ser. No. 13/671,018 is a continuation-in-part of U.S. Ser. No. 13/556,388 filed on Jul. 24, 2012, now U.S. Pat. No. 8,432,117 entitled "Automated Shade Control System". U.S. Ser. No. 13/556,388 is a continuation of U.S. Ser. No. 13/343,912 filed on Jan. 5, 2012, now U.S. Pat. No. 8,248,014 entitled "Automated Shade Control System". U.S. Ser. No. 14/692,868 is also a continuation-in-part of U.S. Ser. No. 14/461,619 filed on Aug. 18, 2014, now U.S. Pat. No. 9,360,731 entitled "Systems and Methods for Automated Control of Electrochromic Glass." U.S. Ser. No. 14/461,619 is a continuation of U.S. Ser. No. 13/656,401 filed on Oct. 19, 2012, now U.S. Pat. No. 8,836,263 entitled "Automated Shade Control in Connection With Electrochromic Glass". U.S. Ser. No. 13/656,401 is a continuation-in-part of U.S. Ser. No. 13/359,575 filed on Jan. 27, 2012, now U.S. Pat. No. 8,723,467 entitled "Automated Shade Control in Connection with Electrochromic Glass." U.S. Ser. No. 13/359,575 is a continuation-in-part of U.S. Ser. No. 13/343,912 filed on Jan. 5, 2012, now U.S. Pat. No. 8,248,014 entitled "Automated Shade Control System". U.S. Ser. No. 13/343,912 is a continuation of U.S. Ser. No. 12/475,312 filed on May 29, 2009, now U.S. Pat. No. 8,120,292 entitled "Automated Shade Control Reflectance Module". U.S. Ser. No. 12/475,312 is a continuation-in-part of U.S. Ser. No. 12/421,410 filed on Apr. 9, 2009, now U.S. Pat. No. 8,125,172 entitled "Automated Shade Control Method and System". U.S. Ser. No. 12/421,410 is a continuation-in-part of U.S. Ser. No. 12/197,863 filed on Aug. 25, 2008, now U.S. Pat. No. 7,977,904 entitled "Automated Shade Control Method and System." U.S. Ser. No. 12/197,863 is a continuation-in-part of U.S. Ser. No. 11/162,377 filed on Sep. 8, 2005, now U.S. Pat. No. 7,417,397 entitled "Automated Shade Control Method and System." U.S. Ser. No. 11/162,377 is a continuation-in-part of U.S. Ser. No. 10/906,817 filed on Mar. 8, 2005 and entitled "Automated Shade Control Method and System." U.S. Ser. No. 10/906,817 is a non-provisional of U.S. Provisional No. 60/521,497 filed on May 6, 2004 and entitled "Automated Shade Control Method and System." The entire contents of all of the foregoing applications are hereby incorporated by reference for all purposes.

The motor, POE network switch 200 and/or IPDHG 300 may use sky camera information and data to optimize functionality. In various embodiments, the system 100 may include a sky camera solution that also has the ability to apply AI to provide sky forecasting. This can contribute to optimizing settings for other building systems like lighting and HVAC based on existing conditions and future conditions. It also can contribute to identifying the optimal energy resource for buildings equipped with options onsite, remote or via utility to employ solar, wind, coal, nuclear, etc. Forecasting could work in tandem with a net energy product to validate the opportunity and quality of charging to identify when the source will be capable of offsetting internal demand. The sky camera system may incorporate any of the feature or functions set forth in U.S. Ser. No. 16/849,834, which is hereby incorporated by reference in its entirety for all purposes. The '834 application is a continuation-in-part of U.S. Ser. No. 16/240,479 filed on Jan. 4, 2019 and entitled "Sky Camera System Utilizing Circadian Information For Intelligent Building Control." U.S. Ser. No. 16/240,479 is a continuation-in-part of U.S. Ser. No. 15/906,674 filed on Feb. 27, 2018 and entitled "Sky Camera System for Intelligent Building Control". U.S. Ser. No. 15/906,674 is a non-provisional of, and claims priority to, U.S. Provisional Patent Application Ser. No. 62/513,733 filed on Jun. 1, 2017 and entitled "Sky Camera System for Intelligent Building Control." U.S. Ser. No. 15/906,674 is also a continuation-in-part of U.S. Ser. No. 14/692,868 filed on Apr. 22, 2015, now U.S. Pat. No. 9,938,765 entitled "Automated Shade Control System Interaction with Building Management System." The entire contents of all of the foregoing applications are hereby incorporated by reference for all purposes.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOME-POD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improve computer performance by, for example, reducing processing times. Furthermore, the distributed computational resources improve computer performance by improving security using, for example, cryptographic protocols.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUIMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system comprising:
a power-over-ethernet (POE) network switch that provides energy;
a controller that communicates with the POE network switch;
a rechargeable battery directly connected to the POE network switch, wherein the rechargeable battery is recharged with the energy directly from the POE network switch; and
a plurality of low duty cycle devices,
wherein, over a first interval, the plurality of low duty cycle devices draw a peak power during activating the low duty cycle devices,
wherein, over a second interval, the plurality of low duty cycle devices draw negligible power, compared with the peak power draw or no power draw,
wherein each of the plurality of low duty cycle devices are configured to be separately charged via the controller, and
wherein, based on if power of the rechargeable battery is sufficient to supply power simultaneously to multiple of the plurality of low duty cycle devices and power draw information about the plurality of low duty cycle devices, the controller determines (i) if the controller uses the energy directly from the rechargeable battery to the controller, then to each of the plurality of low duty cycle devices or (ii) if the controller switches to using the energy from the POE network switch to the controller, then to each of the plurality of low duty cycle devices.

2. The system of claim 1, wherein the plurality of low duty cycle devices comprise one or more non-continuous duty cycle devices.

3. The system of claim 1, wherein the POE network switch further charges one or more continuous duty cycle devices.

4. The system of claim 1, wherein the plurality of low duty cycle devices are charged by the rechargeable battery during at least one of times when the plurality of low duty cycle devices are not operating or low usage of the plurality of low duty cycle devices.

5. The system of claim 1, wherein each of the plurality of low duty cycle devices are separately and directly connected with the controller.

6. The system of claim 1, wherein the plurality of low duty cycle devices include at least one of a motor, lock, light or HVAC (heating, ventilation and air conditioning) device.

7. The system of claim 1, wherein activation of the plurality of low duty cycle devices avoids a time period when the plurality of low duty cycle devices are charged by the rechargeable battery.

8. The system of claim 1, wherein the controller is configured to obtain at least one of current, voltage, power, and energy consumption information about the plurality of low duty cycle devices.

9. The system of claim 1, wherein the controller is configured to power down the plurality of low duty cycle devices, in response to determining that the plurality of low duty cycle devices are not operating.

10. The system of claim 1, wherein the rechargeable battery is further configured to increase a power delivery capability for the low duty cycle devices to support more devices per port.

11. The system of claim 1, wherein the POE network switch is configured to recharge a battery backup.

12. The system of claim 1, wherein instantaneous power delivery to the plurality of low duty cycle devices from the rechargeable battery exceeds the capacity of the POE network switch.

13. The system of claim 1, wherein the POE network switch power supports a power requirement for one or more continuous use devices.

14. The system of claim 1, wherein a first device of the plurality of low duty cycle devices receives a recharging current and relays the recharging current to a second device of the plurality of low duty cycle devices, in response to the first device having sufficient current.

15. The system of claim 1, further configured to recharge the battery during a predetermined time interval.

16. The system of claim 1, wherein the rechargeable battery is configured to be replaced without replacing the plurality of low duty cycle devices.

17. The system of claim 1, wherein a second device of the plurality of low duty cycle devices is restricted from charging, in response to a first device of the plurality of low duty cycle devices being charged by the rechargeable battery.

18. The system of claim 1, wherein a first device of the plurality of low duty cycle devices obtains priority to be charged by the rechargeable battery, in response to the first device having a lower charge.

19. The system of claim 1,
wherein the rechargeable battery comprises a power supply, a recharge port, a recharge circuit and a battery bank,
wherein the POE network switch comprises a power supply, a database and a power regulation unit, and
wherein the controller comprises a power regulation unit, circuitry, a continuous duty network power management unit, a continuous duty network transceiver, a non-continuous duty network power management unit and a non-continuous duty network transceiver.

20. The system of claim 1, wherein the controller is an intelligent power distribution hub and gateway (IPDHG).

\* \* \* \* \*

UNITED STATES PATENT AND TRADEMARK OFFICE
CERTIFICATE OF CORRECTION

| | |
|---|---|
| PATENT NO. | : 12,113,644 B2 |
| APPLICATION NO. | : 17/463396 |
| DATED | : October 8, 2024 |
| INVENTOR(S) | : Stephen P. Hebeisen |

It is certified that error appears in the above-identified patent and that said Letters Patent is hereby corrected as shown below:

In the Claims

Claim 1, Column 22, Line 5, delete "are configured to be separately charged" and insert --are separately charged--

Signed and Sealed this
Twelfth Day of November, 2024

Katherine Kelly Vidal
*Director of the United States Patent and Trademark Office*